(12) United States Patent
Pagel et al.

(10) Patent No.: US 12,287,100 B2
(45) Date of Patent: Apr. 29, 2025

(54) HEATING MAT FOR USE IN A FLOOR STRUCTURE, FLOOR STRUCTURE, AND METHOD FOR PRODUCING SAME

(71) Applicants: Lufthansa Technik AG, Hamburg (DE); Villinger GmbH, Mieders (AT)

(72) Inventors: Florian Pagel, Barmstedt (DE); Romana Koch, Hamburg (DE); Karl Bock, Hamburg (DE); Markus Villinger, Mieders (AT); Nils Beyer, Ellerbek (DE); Niels Dose, Hamburg (DE)

(73) Assignees: Lufthansa Technik AG;, Hamburg (DE); Villinger GmbH, Mieders (AT)

( * ) Notice: Subject to any disclaimer, the term of this patent is extended or adjusted under 35 U.S.C. 154(b) by 719 days.

(21) Appl. No.: 17/438,973

(22) PCT Filed: Mar. 13, 2020

(86) PCT No.: PCT/EP2020/000066
§ 371 (c)(1),
(2) Date: Sep. 14, 2021

(87) PCT Pub. No.: WO2020/187441
PCT Pub. Date: Sep. 24, 2020

(65) Prior Publication Data
US 2022/0146119 A1    May 12, 2022

(30) Foreign Application Priority Data
Mar. 15, 2019    (DE) .................... 10 2019 106 705.7

(51) Int. Cl.
*F24D 13/02* (2006.01)
*B64C 1/18* (2006.01)
*H05B 3/14* (2006.01)

(52) U.S. Cl.
CPC .............. *F24D 13/024* (2013.01); *B64C 1/18* (2013.01); *H05B 3/14* (2013.01); *H05B 2203/013* (2013.01); *H05B 2203/026* (2013.01)

(58) Field of Classification Search
CPC ... B64C 1/18; F24D 13/024; H05B 2203/013; H05B 2203/026; H05B 3/14; H05B 3/34; Y02B 30/00
See application file for complete search history.

(56) References Cited

U.S. PATENT DOCUMENTS 9,914,522 B2 *  3/2018  Nehring .................. H05B 3/34
2004/0195234 A1  10/2004  Kaesler
(Continued)

FOREIGN PATENT DOCUMENTS

DE    102012207708 A1    11/2013
EP        1046576 A2    10/2000
(Continued)

*Primary Examiner* — Dana Ross
*Assistant Examiner* — Joe E Mills, Jr.
(74) *Attorney, Agent, or Firm* — Leydig, Voit & Mayer, Ltd.

(57) ABSTRACT

A heating mat is for use in a floor structure in an aircraft. The heating mat has a layered structure, with a plurality of layers firmly connected to one another, with a layer sequence. The layer sequence includes: a) a walkable protection layer having an unfinished floor covering material made of fiberglass-reinforced plastic or aramid fiber-reinforced plastic; b) an electrically conductive ground fault detection layer; c) an electrical insulation layer; and d) a flat electrical heating element having an electrically conductive heating varnish layer.

20 Claims, 3 Drawing Sheets

(56) References Cited

U.S. PATENT DOCUMENTS

| | | | |
|---|---|---|---|
| 2009/0200285 A1* | 8/2009 | Raidt | H05B 3/36 29/611 |
| 2016/0340020 A1 | 11/2016 | Owens et al. | |
| 2018/0128849 A1* | 5/2018 | Wong | G01P 5/165 |
| 2020/0015323 A1* | 1/2020 | Chen | H05B 3/145 |

FOREIGN PATENT DOCUMENTS

| | | |
|---|---|---|
| EP | 1854719 A2 | 11/2007 |
| EP | 3015360 A1 | 5/2016 |
| EP | 3095690 A2 | 11/2016 |
| WO | WO 9515670 A1 | 6/1995 |
| WO | WO 0117850 A1 | 3/2001 |
| WO | WO 2017186895 A1 | 11/2017 |

* cited by examiner

HEATING MAT FOR USE IN A FLOOR STRUCTURE, FLOOR STRUCTURE, AND METHOD FOR PRODUCING SAME

CROSS REFERENCE TO RELATED APPLICATIONS

This application is a U.S. National Phase application under 35 U.S.C. § 371 of International Application No. PCT/EP2020/000066, filed on Mar. 13, 2020, and claims benefit to German Patent Application No. DE 10 2019 106 705.7, filed on Mar. 15, 2019. The International Application was published in German on Sep. 24, 2020 as WO 2020/187441 A1 under PCT Article 21(2).

FIELD

The present invention relates to a heating mat for use in a floor structure, in particular in aircraft, to a floor structure comprising a corresponding heating mat, and to a method for producing such a floor structure.

BACKGROUND

At the cruising altitude of commercial aircraft (usually 30,000 ft or 9,145 m), outside temperatures range from −50° C. to −60° C. To achieve comfortable temperatures of usually between 20° C. and 24° C. in the cabin of a commercial aircraft, one or more air-conditioning systems are provided, which heat the cabin interior accordingly. The aircraft cabin is thermally insulated all around by fiberglass mats.

Particularly in the area of the aircraft doors, for design reasons there are regularly cold bridges, which lead to a significantly lower temperature of the floor in the door area compared to the other areas of the cabin. This is unpleasant and can even be detrimental to the health of passengers, who frequently use the door area when waiting for an on-board toilet to become available, and the crew, whose seats for takeoff and landing are regularly located in the door area. However, cold bridges, and thus undesirably low floor temperatures, may also occur in other areas, for example in the galley or passenger area.

A system may be provided in which a heating wire and a temperature sensor are integrated into the base plate forming the basis of the floor structure. The heating wire is supplied with electric current via a control unit in order to achieve a desired temperature. The temperature sensor ensures here that the base plate does not overheat.

A disadvantage of this system, as recognized by the present inventors, is its susceptibility to corrosion. Particularly in the area of the aircraft doors, as well as in the area of the galleys, the floor is regularly exposed to moisture, which, according to experience, easily leads to corrosion of the hot wire in the known floor panels. Corresponding corrosion damage regularly leads to failure of the heating system of a floor panel, which necessitates replacement of the entire floor panel. Because the floor panel is the basis of the entire floor structure, and thus forms the lowermost layer of the floor, replacement of a floor panel with failed heating is very laborious and costly. In particular, if the floor slab in question is partially located under cabin fixtures, such as the galley, it may not be possible to replace it at all with reasonable effort, and therefore the underfloor heating in this area will remain unavailable until the cabin is completely refurbished.

SUMMARY

In an embodiment, the present disclosure provides a heating mat that is for use in a floor structure in an aircraft. The heating mat has a layered structure, with a plurality of layers firmly connected to one another, with a layer sequence. The layer sequence includes: a) a walkable protection layer having an unfinished floor covering material made of fiberglass-reinforced plastic or aramid fiber-reinforced plastic; b) an electrically conductive ground fault detection layer; c) an electrical insulation layer; and d) a flat electrical heating element having an electrically conductive heating varnish layer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
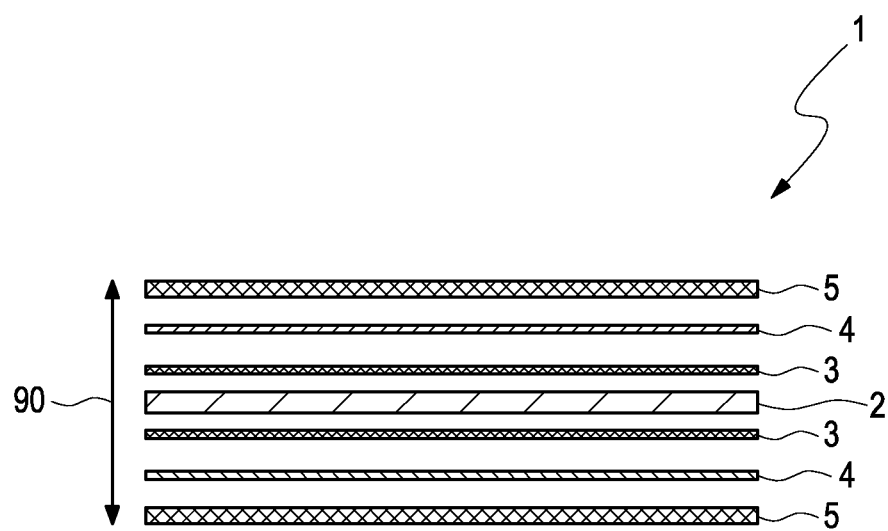
FIG. 1a and FIG. 1b: show schematic representations of the layered structure of a heating mat according to an embodiment of the invention.
Figure 1:
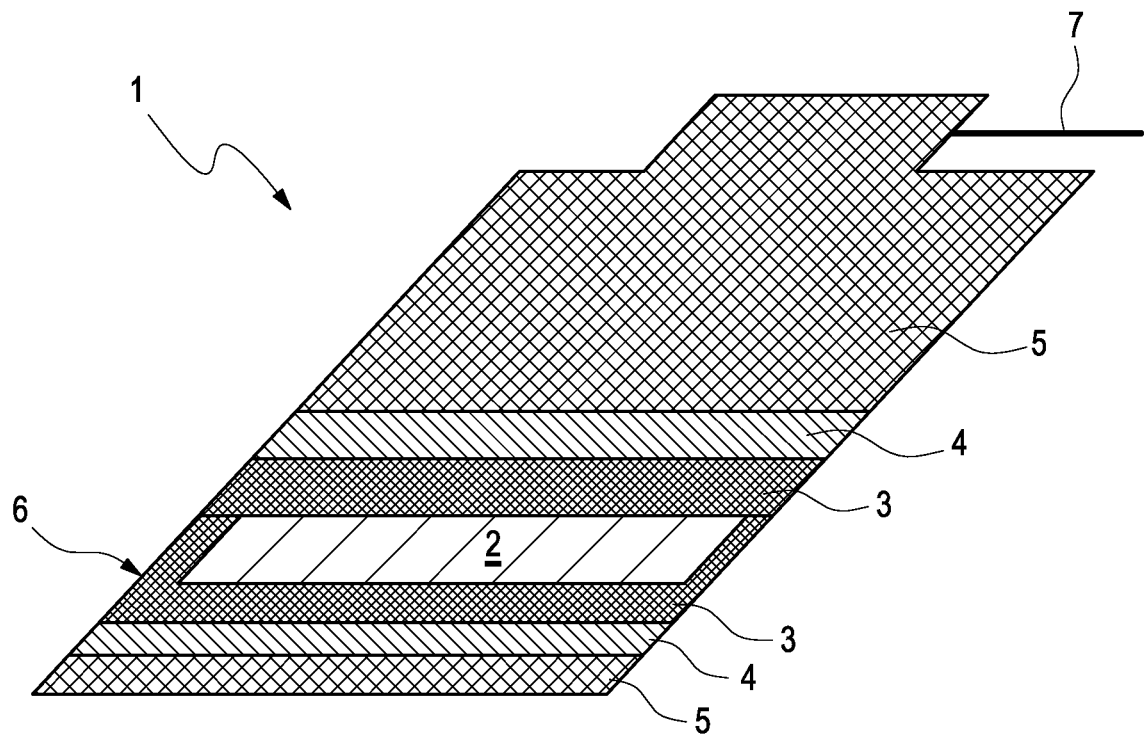

In an embodiment, the present invention provides a heating mat for use in a floor structure, in particular in aircraft, a corresponding floor structure, and a method for producing such a floor structure, in which the disadvantages of the prior art no longer occur or occur only to a reduced extent.

Accordingly, aspects of the present invention relate to a heating mat for use in a floor structure, in particular in aircraft, wherein the heating mat has a layered structure with a plurality of layers which are firmly connected to one another, with the layer sequence:
   a) walkable protection layer comprising an unfinished floor covering material made of fiberglass-reinforced and/or aramid fiber-reinforced plastic;
   b) electrically conductive ground fault detection layer;
   c) electrical insulation layer; and
   d) flat electrical heating element comprising a flat electrically conductive heating varnish layer.

Furthermore, aspects of the present invention relate to a floor structure, in particular for an aircraft, comprising:
   an unfinished floor having a recess for a heating mat,
   a heating mat according to the invention arranged in the recess, and
   a floor covering laid on the unfinished floor and over the heating mat,
      where the recess in the unfinished floor is adapted to the width, length and thickness of the heating mat.

In addition, aspects of the present invention relate to a method for producing a floor structure according to the invention, comprising the steps:

a) making a recess in the uppermost layer of the unfinished floor, which recess is adapted to the dimensions of the heating mat;
b) inserting the heating mat into the recess; and
c) laying a floor covering on the unfinished floor and over the heating mat.

First, some terms used in conjunction with the invention will be explained.

A protection layer is "walkable" if it can withstand frequent foot traffic and the associated stresses on a permanent basis and protects the underlying layers from these stresses. Preferably, the protection layer is also "scratch-resistant" so that, for example, even small stones carried in the profile of shoes do not damage the protection layer.

A cable is connected to a layer "plug-free" if the cable is detachably or non-detachably connected to the element, wherein the extension of the connection in the thickness direction of the layer is not or is only insignificantly greater than the extension of the cable in this direction. For example, the cable may be soldered to a suitable solder terminal of the element.

The heating mat according to an embodiment of the present invention is characterized by a flat electrical heating element comprising a flat electrically conductive heating varnish layer. An electrically conductive heating varnish is a material which—when an electric current flows through it—emits heat to the surrounding environment, often mainly in the form of infrared radiation. The heating varnish layer is two-dimensional, i.e. it does not follow a looped path between two connection points, as a heating wire does, for example, in order to ultimately form a flat heating element, but rather fills out the heating element two-dimensionally. Due to the temperature control regularly inherent in a heating varnish, which control is based on the local change in electrical resistance in the heating varnish, it is nevertheless possible in principle to achieve a situation in which the heating varnish has electrical current flowing through it over the entire surface and emits heat accordingly. At the same time, the temperature-dependent electrical resistance often results in a maximum achievable temperature of the heating varnish as well as the possibility of temperature control by measuring the resistance.

It is preferred if the electrically conductive heating varnish layer is preferably free of carbon nanotubes and/or comprises a polymer and/or a semiconductor material. A corresponding, suitable heating varnish is described, for example, in DE 10 2012 207 708 A1, to which full reference is made. In particular, reference is made to the embodiment shown as preferred according to paragraphs [0015] and [0041] there.

To form a heating element suitable for a layered structure, the heating varnish can be applied to a substrate, for example a film-like substrate. However, it is also possible for the heating varnish to be applied directly to the layer of the layered structure provided in accordance with the present invention adjacent to the heating element, i.e. in particular to the or an electrical insulation layer.

The use of an electrically conductive heating varnish layer in the heating element also offers the advantage that even if the heating varnish layer is damaged by a foreign body penetrating all layers of the heating mat up to the layer of the heating element, the basic functioning of the heating element is not impaired—unlike in the case of a severed heating wire. Nevertheless, in order to prevent electric current from escaping from the heating mat via a foreign body projecting as far as the heating element, an electrically conductive ground fault detection layer is arranged on the side of the insulation layer facing away from the heating element. The ground fault detection layer can be, for example, a metal foil, another electrically conductive foil or an electrically conductive paint. If a current flow is detected via the ground fault detection layer, the ground fault detection layer is electrically connected to the heating varnish layer via a foreign body. To avoid the risk of electric shock, etc., the power supply to the heating element can then be interrupted. Once the foreign body has been removed, however, the heating element can basically be put back into operation.

The heating mat according to an embodiment of the present invention is terminated by a walkable protection layer which comprises and is preferably formed from an unfinished floor covering material made of fiberglass-reinforced and/or aramid fiber-reinforced plastic. The protection layer according to an embodiment of the present invention protects the underlying layers from damage due to the stresses that usually occur when the heating mat is used in the floor region. Preferably, the unfinished floor covering material is a fiberglass-reinforced and/or aramid fiber reinforced plastic approved for use as an unfinished floor covering in aircraft.

It is preferred if the layer sequence of the heating mat is symmetrical and therefore has further layers, specifically:
e) a further electrical insulation layer;
f) a further electrically conductive ground fault detection layer; and
g) a further walkable protection layer;
wherein preferably at least some of the pairwise symmetrical layers are formed identically in each case. "Identical" in this case means that the layers in question are each made of the same material and/or have the same layer thickness. If both the materials and the layer thicknesses of all the pairs of layers arranged symmetrically to the heating element are identical, the heating mat can be arranged as desired in the floor area without having to observe a preferred direction. This is particularly advantageous for asymmetrically designed heating mats, which can then be oriented as required. The same also applies in order to achieve a desired or required arrangement of connections of the heating mat, if necessary.

Preferably, the layers of the heating mat are sealed at the circumferential edge of the heating mat to prevent moisture, dirt, or the like from penetrating between the layers of the heating mat. Depending on the material of the individual layers, the layers can be heat sealed. Since the sealing can impair the function of the heating element and/or since the heating element is not suitable for direct sealing, depending on the sealing technique selected, it is preferred if the heating element is set back from the circumferential edge. In this case, sealing is carried out exclusively with other layers, which then completely and tightly enclose the heating element.

A power supply cable is preferably connected to the heating element plug-free. An appropriate plug-free connection ensures that the connection of the power supply cable is not bulky or only barely bulky. The power supply cable is preferably a ribbon cable. The power supply cable can preferably have a similar thickness to the heating mat. Independently of this, the power supply cable can also have at least one additional core for connecting at least one ground fault detection layer, so that no separate lines are required for ground fault monitoring.

By using an electrically conductive heating varnish layer in the heating element and despite the layer structure required as a result, a low thickness of the heating mat can be achieved. The thickness of the heating mat can be, for example, between 0.8 mm and 2.4 mm, preferably between 1.0 mm and 2.2 mm, further preferably between 1.2 mm and 2.0 mm.

The heating element is preferably adapted to the voltage of 115 VAC or 28 VDC, which is common on board an aircraft, for the maximum heating power.

Due to the low thickness of the heating mat, it is possible that it is merely inserted in a recess in the unfinished floor—i.e. an indentation accessible from above—before the actual floor covering is laid over it, resulting in the floor structure according to an embodiment of the present invention.

In particular, unlike in the prior art, it is no longer necessary to completely replace an element or the lowermost element of the floor structure. Also, the heating element is still comparatively easy to reach after installation and completion of the floor structure and can be replaced if necessary. For this purpose, only the floor covering has to be removed, which is usually only attached to the unfinished floor with double-sided adhesive tape. The heating mat according to an embodiment of the present invention is particularly suitable for retrofitting since the recess required for the heating mat can regularly be made subsequently in an unfinished floor.

Regardless of whether the heating mat according to an embodiment of the present invention is retrofitted into a floor, in a particularly preferred embodiment, the recess provided or to be created for this purpose should be adapted to the width, length and thickness of the heating mat. This is to avoid unevenness in the final floor, which would mean additional stresses on the floor.

The layer of the unfinished floor intended for supporting the floor covering can be formed, for example, from fiberglass-reinforced plastic panels or mats, which preferably have a thickness comparable to that of the heating mat. The required recess can then be created by a cutout in these very same panels or mats. If necessary, these can also be created in the course of a retrofitting process.

It is preferred if a slot is provided in the unfinished floor to accommodate the power supply cable starting from the recess. The power supply cable can then be routed to a suitable connection point in an easily created recess in the plane of the unfinished floor, without having to modify the structure of the aircraft for this purpose. In particular, if the power supply cable is a ribbon cable, it is regularly sufficient if the slot is merely located in the layer of the unfinished floor intended for supporting the floor covering. The floor covering can then regularly span the slot without causing any unevenness in the floor.

For an explanation of the method according to embodiments of the present invention, reference is made to the above statements. As already explained, the heating mat according to an embodiment of the present invention is suitable both for original equipment of an aircraft and for retrofitting, for which purpose, of course, the floor covering should be removed and then a suitable recess created in the already laid unfinished floor before the heating mat is installed and then the floor covering is reapplied. If an original equipment is being performed, the recess can be created by providing a suitable cutout in the layers of the unfinished floor before these are placed in the aircraft.

FIGS. 1a and 1b schematically illustrates the layered structure of a heating mat 1 according to an embodiment of the present invention. FIG. 1a shows the basic, not-to-scale, layered structure in cross section, while FIG. 1b shows the heating mat 1 in partial elevation.

Centrally, in the heating mat 1, is a flat electric heating element 2 comprising an electrically conductive heating varnish layer. The heating varnish layer is applied to a substrate film, is free of carbon nanotubes and comprises a polymer and also a semiconductor material. A power supply cable 7, which is designed as a ribbon cable and makes electrical contact with the heating varnish layer plug-free, is connected to the heating element 2. The heating element 2 thus corresponds substantially to the heating device according to German patent application DE 10 2012 207 708 A1.

The heating element 2 is surrounded on both sides by an electrical insulation layer 3, these insulation layers being identical in design.

This is followed in each case by an electrically conductive ground fault detection layer 4. In the embodiment shown, the ground fault detection layers 4 are preferably formed from an identical, electrically conductive varnish, although the use of identical metal foils is also possible in principle. Both ground fault detection layers 4 are electrically connected to a core in the power supply cable 7 provided as a ground fault detection strand.

The layered structure of the heating mat 1 is completed by walkable protection layers 5, which are identical on both sides of the heating mat 1. The protection layers 5 are made of fiberglass-reinforced and/or aramid-fiber-reinforced plastic approved for use as unfinished floor covering in aircraft.

The individual layers 2-5 are bonded to each other over their entire surface. In addition, the layers 3-5 are heat-sealed at the circumferential edge. Since the heating element 2 is not suitable for heat sealing, the heating element 2 is set back relative to the other layers 3-5 so that a heating-element-free area 6 is formed at the circumferential edge, in which area the heat sealing takes place. The heating element 2 is thus completely and tightly enclosed by the other layers 3-5.

The total thickness 90 of the heating element 1 from FIGS. 1a and 1b is 1.27 mm.

Figure 2:
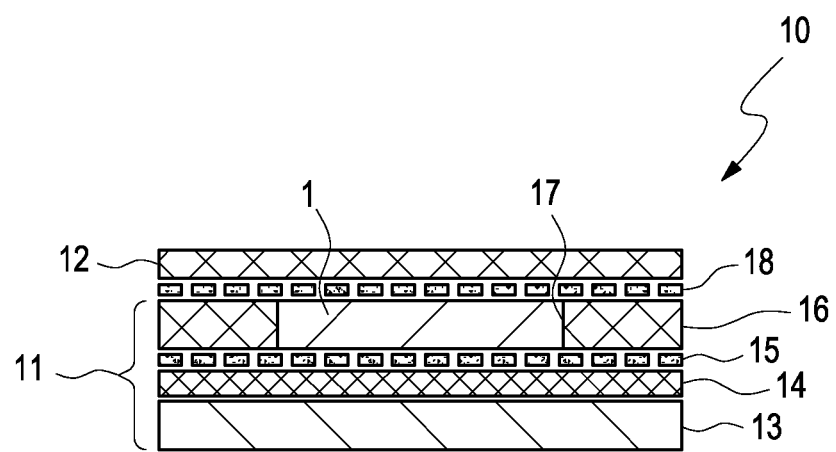
FIG. 2a and FIG. 2b: show schematic representations of a floor structure according to an embodiment of the present invention with a heating mat according to the invention according to FIG. 1.
Figure 2:
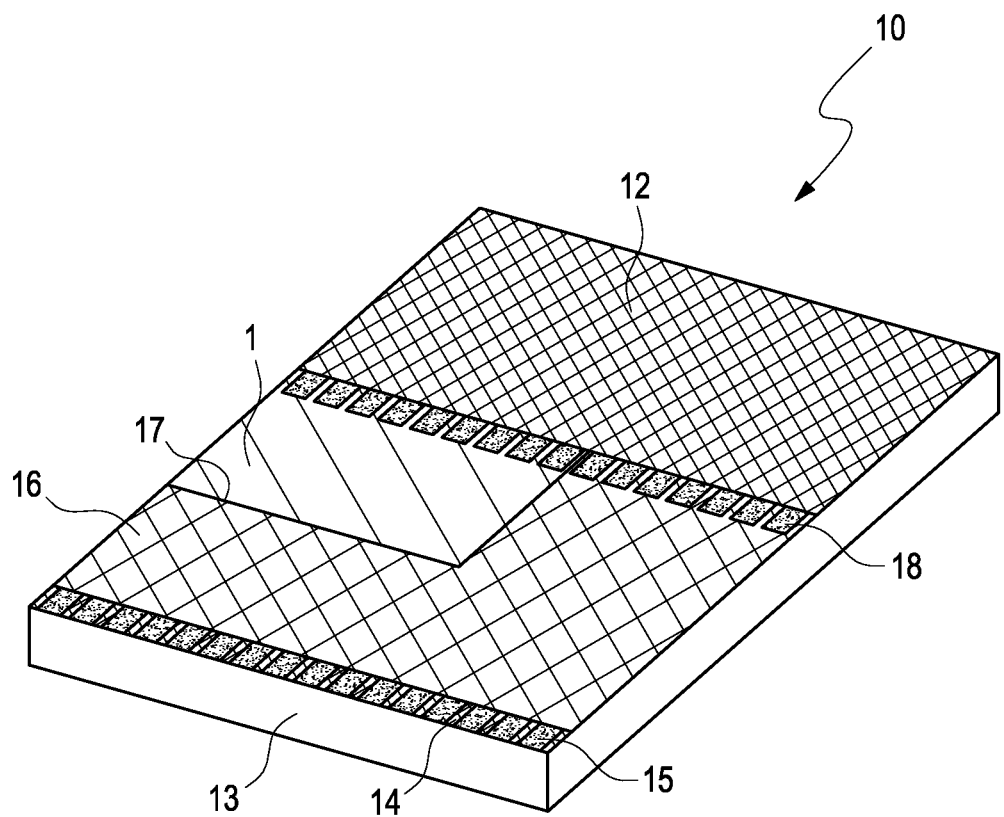

FIGS. 2a and 2b show a floor structure 10 according to an embodiment of the present invention comprising an unfinished floor 11 and a floor covering 12.

The unfinished floor 11 is based on a floor panel 13 (without heating elements), on which a vinyl-containing water barrier layer 14 is arranged. A layer 16 of fiberglass-reinforced plastic mat for supporting the floor covering 12 is attached to this water barrier layer with the aid of an adhesive tape 15. The layer 16 has a thickness of 1.27 mm corresponding to the total thickness 90 of the heating element 1. Thus, the recess provided in this layer 16 with extension matching the length and width of the heating element 1 forms a recess 17 which corresponds to the heating element 1 in length, width and also thickness.

The heating element 1 is inserted into this same recess 17, resulting in a practically continuous flat surface formed by the heating element 1 and layer 16. The floor covering 12 is attached to this surface by means of adhesive tape 18. The floor covering 12 may be carpet or non-textile covering.

Figure 3:
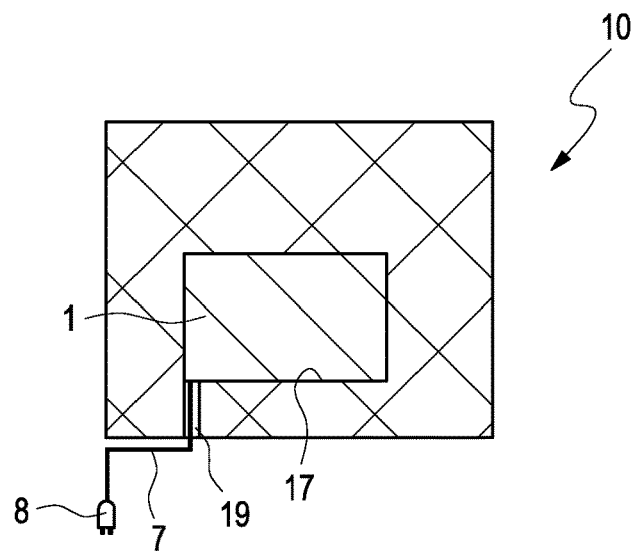
FIG. 3a and FIG. 3b: show schematic representations of the embedding of a heating mat according to an embodiment of the present invention in the floor of an aircraft.
Figure 3:
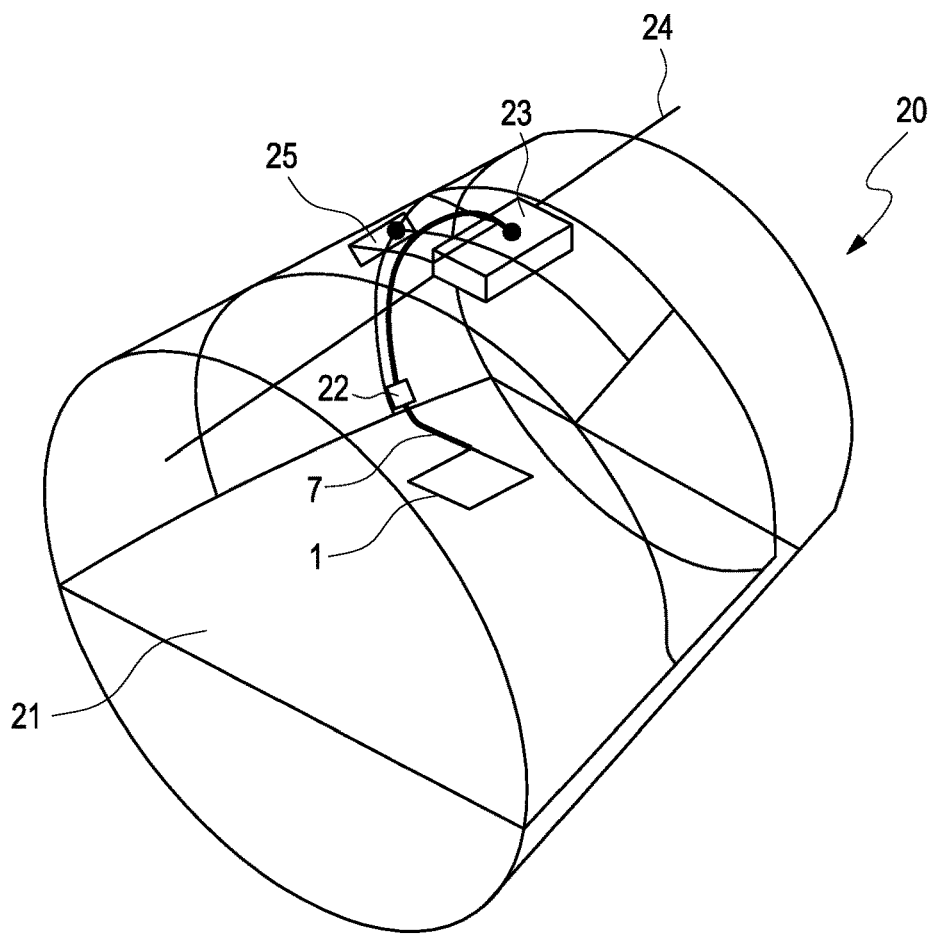

FIGS. 3a and 3b show the integration of the heating mat 1 from FIGS. 1a and 1b or the realization of the floor structure 10 according to FIGS. 2a and 2b in the floor 21 of an aircraft 20.

As can be seen in FIG. 3a, not only is a recess 17 provided in the floor structure 10 for the heating mat 1, but there is also a slot 19, through which the power supply cable 7 is routed, without the power supply cable 7 causing any unevenness in the floor covering 12. The power supply cable 7 is led laterally out of the floor structure 10 and is provided with a plug 8 at the free end.

The plug 8 may be connected, for example, to a socket 22 located behind the wall paneling inside an aircraft 20. The socket 22 is connected to the aircraft internal power supply 24 via a control box 23. Furthermore, a control panel 25, for example a switch, connected to the control box 23 is provided in the area of the wall paneling, by means of which control panel the temperature of the heating mat 1 can be set.

The control box 23 is designed to control the electrical energy supplied to the heating mat 1 in order to achieve the desired temperature set at the control panel 25. The temperature is checked solely by determining the electrical resistance of the heating element 2 of the heating mat 1, which can be determined directly in the control box 23. A separate temperature sensor in the area of the heating mat 1 is therefore not required. The control box 23 also monitors the absence of voltage in the ground fault detection layers 4 of the heating mat 1 and interrupts the electrical supply to the heating mat 1 as necessary.

The heating mat 1 according to an embodiment of the present invention is particularly suitable for use in areas where moisture may regularly occur, such as door or kitchen areas. However, it is of course also possible to use the heating mat 1 according to the invention in any other location in an aircraft or in any other environment.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A heating mat for use in a floor structure, in an aircraft, wherein the heating mat comprises a layered structure with a plurality of layers firmly connected to one another, with a layer sequence comprising:
   a) a walkable protection layer comprising an unfinished floor covering material made of fiberglass-reinforced plastic or aramid fiber-reinforced plastic;
   b) an electrically conductive ground fault detection layer;
   c) an electrical insulation layer; and
   d) a flat electrical heating element comprising an electrically conductive heating varnish layer, wherein an electrically conductive varnish material of the electrically conductive heating varnish layer is configured to emit heat in response to receiving an electrical current.

2. The heating mat as claimed in claim 1, wherein the layer sequence is symmetrical and comprises as further layers:
   e) a further electrical insulation layer;
   f) a further electrically conductive ground fault detection layer; and
   g) a further walkable protection layer, and
   wherein at least some of the pairwise symmetrical layers are formed identically in each case.

3. The heating mat as claimed in claim 1, wherein the layers of the heating mat are sealed at a circumferential edge of the heating mat.

4. The heating mat as claimed in claim 1, wherein a power supply cable is attached to the heating element plug-free.

5. The heating mat as claimed in claim 1, wherein the electrically conductive heating varnish layer is free of carbon nanotubes, or comprises a polymer or a semiconductor material.

6. The heating mat as claimed in claim 1, wherein the walkable protection layer is made of an unfinished floor covering material.

7. The heating mat as claimed in claim 1, wherein the thickness of the heating mat is between 0.8 mm and 2.4 mm.

8. The floor structure for the aircraft, the floor structure comprising:
   an unfinished floor with a recess for the heating mat,
   the heating mat as claimed in claim 1, inserted in the recess, and
   a floor covering laid on the unfinished floor and over the heating mat,
   wherein the recess in the unfinished floor is adapted to a width, a length, and a thickness of the heating mat.

9. The floor structure as claimed in claim 8, wherein a layer of the unfinished floor provided for supporting the floor covering is made of fiberglass-reinforced plastic panels or mats which have a thickness comparable to the thickness of the heating mat.

10. The floor structure as claimed in claim 8, wherein a slot is provided in the unfinished floor for receiving a power supply cable starting from the recess.

11. A method for producing the floor structure as claimed in claim 8, the method comprising:
   a) making the recess adapted to dimensions of the heating mat in an uppermost layer of the unfinished floor;
   b) inserting the heating mat into the recess; and
   c) laying a floor covering on the unfinished floor and over the heating mat.

12. The method as claimed in claim 11, wherein the floor covering resting on the unfinished floor is removed before making the recess.

13. The method as claimed in claim 11, wherein before the unfinished floor is produced, the recess is made in the element forming the termination of the unfinished floor before the element is laid.

14. The method as claimed in claim 11, wherein a slot is provided in the unfinished floor for receiving the power supply cable starting from the recess.

15. The heating mat as claimed in claim 3, wherein the heating element is arranged set back from the circumferential edge.

16. The heating mat as claimed in claim 4, wherein the power supply cable is a ribbon cable or has at least one additional core for connecting at least one ground fault detection layer.

17. The heating mat as claimed in claim 6, wherein the unfinished floor covering material comprises a fiberglass-reinforced plastic or aramid fiber-reinforced plastic approved for use the unfinished floor covering in the aircraft.

18. The heating mat as claimed in claim 7, wherein the thickness of the heating mat is between 1.0 mm and 2.2 mm, or between 1.2 mm and 2.0 mm.

19. The heating mat as claimed in claim 1, wherein the electrically conductive varnish material is adhered to a surface of a substrate of the flat electrical heating element.

20. The heating mat as claimed in claim 1, wherein the electrically conductive varnish material is adhered to a surface of the electrical insulation layer.

\* \* \* \* \*